Feb. 25, 1969  C. T. BREITENSTEIN ET AL  3,429,253
APPARATUS FOR HOT BEVERAGE BREWING
Filed July 20, 1965

INVENTORS
CHARLES T. BREITENSTEIN
DONALD C. PEARL
BY  WALTER A. ELIASON

Marvin M. Chaban
ATTY.

FIG. 2

INVENTORS
CHARLES T. BREITENSTEIN
DONALD C. PEARL
BY   WALTER A. ELIASON

Marvin M. Chaban
ATTY.

INVENTORS
CHARLES T. BREITENSTEIN
DONALD C. PEARL
BY   WALTER A. ELIASON.

Marvin M Chaban
ATTY.

United States Patent Office 3,429,253
Patented Feb. 25, 1969

3,429,253
APPARATUS FOR HOT BEVERAGE BREWING
Charles T. Breitenstein, Elk Grove Village, Donald C. Pearl, Lake Zurich, and Walter A. Eliason, Chicago, Ill., assignors to Canteen Corporation, Chicago, Ill., a corporation of Delaware
Filed July 20, 1965, Ser. No. 473,360
U.S. Cl. 99—283  14 Claims
Int. Cl. A23f *3/00;* A47j *31/00*

The present invention relates to hot beverage brewing and more particularly to an improved device for brewing coffee or tea or other extractive liquids, automatically on demand.

The invention has as a major object to provide a new and improved hot beverage brewer such as a coffee or tea brewer.

The invention has another object to provide an automatic brewer of the closed cylinder type which recirculates brewed liquid through the brew solids in the cylinder at least a second time before dispensing the brewed liquid.

It is a further object of the invention to provide a compression brewer which brews the liquid and passes the liquid through a new and improved, horizontally movable filter.

It is a still further object of the invention to provide an improved hot beverage brewer which brews individual portions in single cup quantity quickly, efficiently, and economically.

The invention is applicable to coin-operated vending machines which brew the beverage in large batches for subsequent dispensing in small quantities, but is especially applicable to machines in which a single cup of coffee or tea is individually brewed on demand for each dispensing operation. The explanation of the invention will primarily be directed to the brewing of coffee although the apparatus as designed is applicable to any type extractive brewing of leachable solids under sanitary condition (of the type necessary where the output beverage is produced for human consumption). In such brewers, as generally known, ground coffee is fed into the brew chamber. Water heated to a temperature slightly below its boiling point is fed to the chamber and is steeped there for a finite length of time to brew the output beverage. The beverage is then drawn or pumped through a filter for subsequent dispensing. The coffee grounds are in some manner removed from the chamber, either by removal and replacement of the filter, by gravitational dumping of the grounds or by flushing the filter with a charge of liquid. A clean or cleansed filter is then placed in the chamber prior to the start of the new brew cycle.

In one generally known form of brewer, a roll of filter paper tape is used. The tape may have individual charges of ground coffee packed in it, or may be positioned so that ground coffee is dropped onto it. The tape is moved into the brew chamber for brewing, after which the leached coffee grounds and filter are removed toward a waste area.

In another known technique, a fine mesh filter screen is used in place of the described tape, the screen being drawn away, flushed with liquid under pressure, and returned to the brew position each cycle.

Both of these forms of filter have been used with brew chambers. Such chambers have used opposed joined cones, and more usually upright or recumbent cylinders. The cylinders have been open at one end, closable at one end, or closable at both ends. Water may be fed under pressure to force the brew liquid through the grounds, piston pressure may be used, or merely the force of gravity. Brewed coffee may be removed by vacuum pressure, by gravitational flow or by the pressure generated by a force imparted to the liquid.

All of these known systems have disadvantages which range from sanitation problems due to the storage of grounds and flush water, due to wet grounds and paper tapes, or due to the difficulty of properly cleaning the reusable filter. Tapes packaged with the coffee grounds between their layers have been employed with less than commercial success for a number of reasons.

One major problem which must be solved to insure a good degree of success, concerns the filter, in that it must be strong enough to hold the grounds, must have sufficient strength to withstand hot water under pressure, must be fine enough to filter out most of the grounds, while passing the hot brewed liquid, and must allow thorough cleaning.

The present invention solves many of these problems and cures a great number of the other disadvantages inherent in other proposed solution. The present invention utilizes a vertical hollow cylinder resting on a metallic horizontally reciprocable filter screen. A form of double-acting piston is used to effect the brew action and the pumping out of brewed beverage. The filter used is made of a sheet of metallic material which is etched from both sides to produce a series of spaced openings or pores through the sheet. The porous sheet has none of the depressed cross members of the type inherent in woven mesh screens. The porous sheet may be scraped and the surface will be cleaned thoroughly. This ability to be scraped contrasts sharply with the mesh screen in which there is no smooth surface to be scraped. As an added feature of the present invention, a quantity of air is trapped below the piston during the brew cycle and is forced through the coffee grounds after the brewed beverage to partially dry the grounds on the filter and facilitate their handling.

The operative cycle for the present invention may be summed up as follows: First, the central plunger of the piston is raised to create an annular gap between the plunger and the central opening in the piston. The plunger and piston are then jointly raised within the brew chamber. Coffee grounds are fed into the opening or gap between the plunger and piston. The grounds fall onto the filter within the chamber and are accompanied by water heated to a temperature of from 190° to 205° F. The plunger is closed onto the piston closing the annular feed gap and forming a seal between the plunger and piston. The piston is depressed to force the hot water through the grounds and filter. On this piston downstroke, the brewed coffee is directed into a bypass system. The plunger is retracted from the piston to open the central piston opening. The partially brewed beverage flows from the bypass system through the piston opening into the chamber. A final downstroke of the plunger and piston pumps the brewed beverage through the grounds a second time. The beverage is followed by a charge of compressed air which partially dries the grounds. This time, the twice-brewed coffee beverage is dispensed to the dispensing cup. The cylinder is then raised a short distance to allow the filter to be drawn horizontally past cleaning scrapers for removal of the dried grounds.

A number of advantages are gained by this form of cycle. First, by passing the brew liquid through the grounds twice, a greater portion of the aromatic oils in the grounds are released to effect a stronger liquid from comparatively less grounds. Secondly, by forcing the partially brewed liquid with its dispersion of fine grounds through the bed formed by the bulk of the grounds, the bed acts as a fine filter trapping thereon a greater proportion of the fine grounds. The result is a clear liquid bearing a minimum of fine grounds.

Other objects, features, and advantages of the invention will become apparent from the following description taken in conjunction with the drawings in which.

Figure 1:
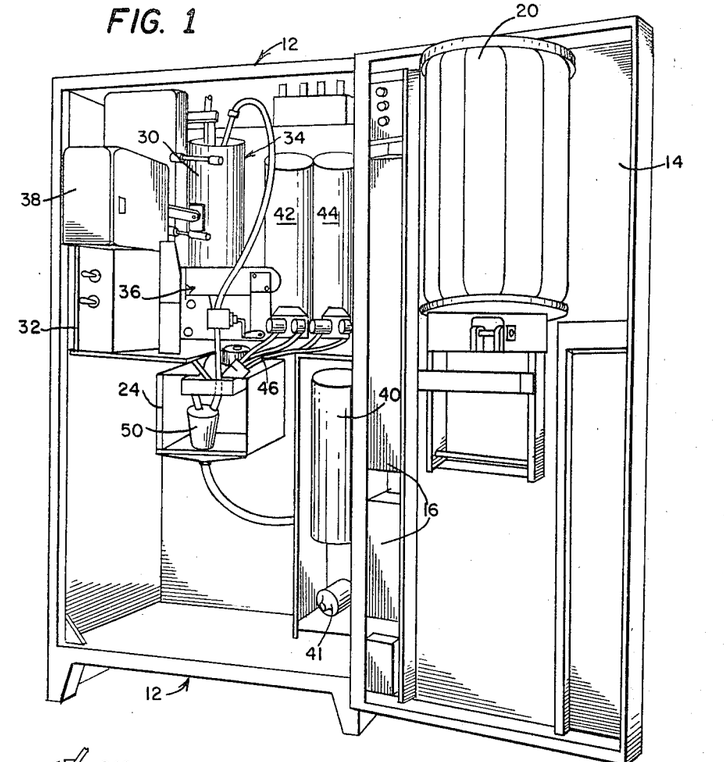
FIGURE 1 is a front view in perspective of a vending machine utilizing the brewing device, the machine being shown with its front door fully open.

In FIGURE 1, there is shown a vending machine cabinet 12 of conventional size and rectangular shape. On the front door 14, shown in FIGURE 1 in the open position, there are mounted the conventional coin receiving mechanisms and selectors 16, shown only as boxes. The coin receiving mechanism receives coins inserted from the machine exterior, validates, and evaluates the coin and registers credit commensurate with the coinage inserted. Selection buttons (not shown) on the front door 14 are individually depressible to initiate operation for dispensing the selected beverage. A conventional cup storage and dispensing unit 20 is mounted on the door above the cup or dispensing opening 22.

The dispensing opening 22 in the door 14 is positioned in front of a cup holding station 24, the station 24 being below the cup storage unit 20 (with the door in the closed position). Also positioned above the cup holding station 24 are the outlet ends of tubes from additive products such as cream and sugar and from the main products such as chocolate, soup, tea, and coffee.

The apparatus 30 used to brew the tea or coffee is mounted on a shelf 32 above and to the left, rear of the cup station 24. The apparatus 30 generally includes as its major elements a brew chamber 34, a filter and filter control apparatus 36 below the chamber, and a brew control mechanism 38.

Also in the cabinet of FIGURE 1, there is provided a conventional hot water tank 40 which heats water to the brew temperature of 195°–205° F. The water is conventionally pumped from the tank by a pump 41 for brewing coffee or tea and for mixing with soluble chocolate or soup powders. The chocolate and soup mechanisms shown as boxes 42 and 44 are well-known and need not be described in detail herein. The output of the chocolate and soup beverage production are fed on selection and insertion of proper coinage, in any known manner, through individual outlet tubes 46 and 48 for dispensing to a cup positioned in the cup station as indicated by cup 50.

Figure 2:
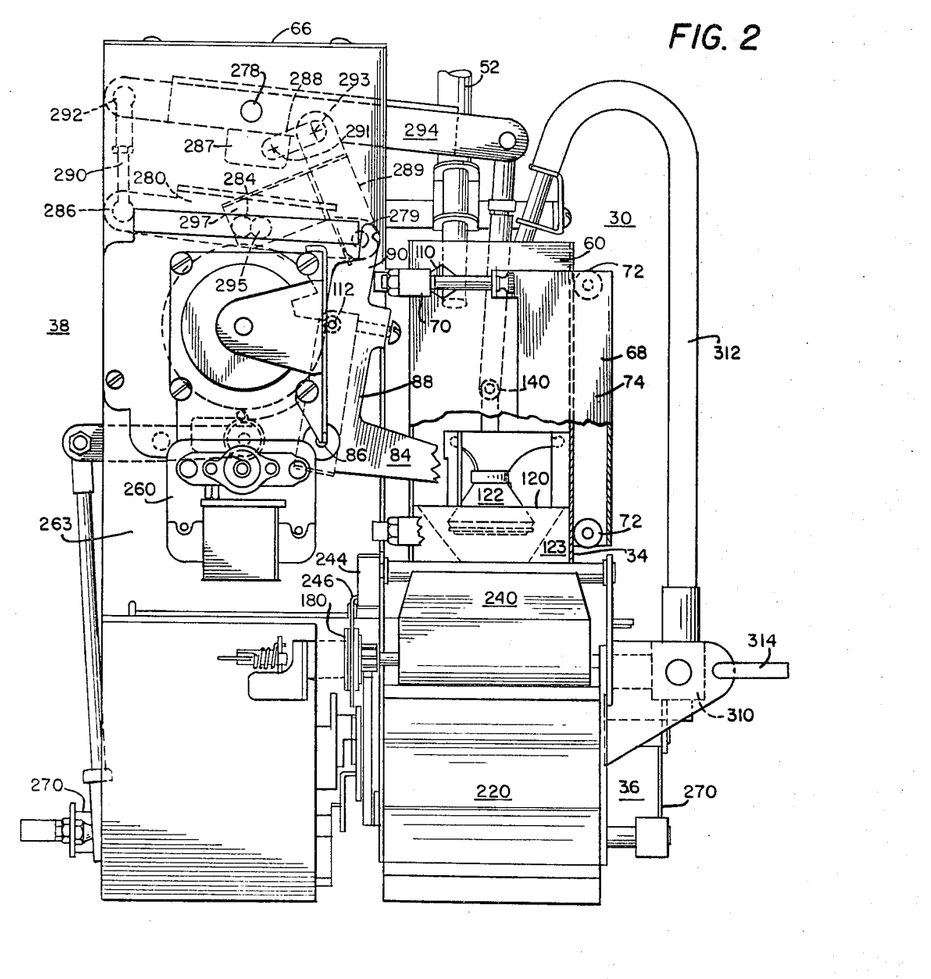
FIGURE 2 is a front view in elevation of the brewing device embodying the present invention.
Figure 3:
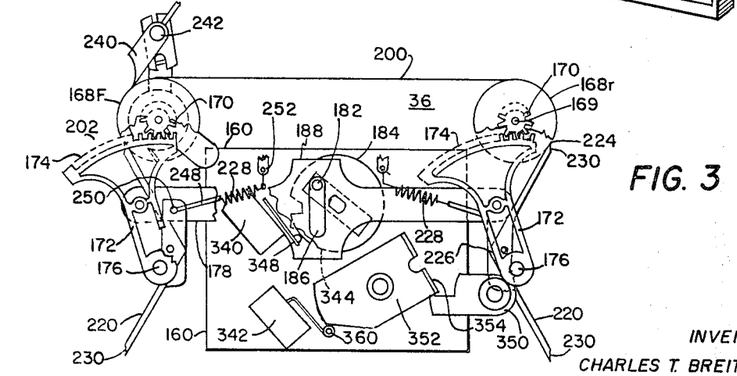
FIGURE 3 is a side view in elevation of the filter and filter control apparatus, as used herein.
Figure 4:
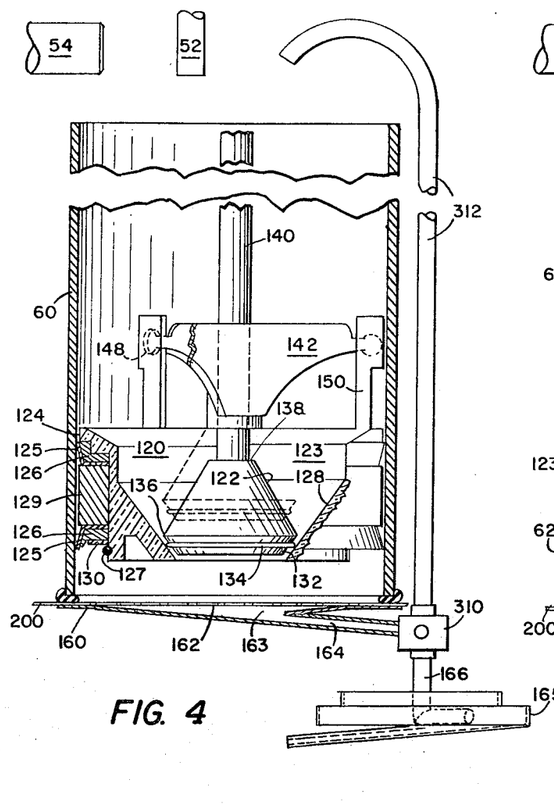
FIGURE 4 is a partially diagrammatic sectional view of the brew chamber during the brewing process to diagrammatically illustrate the operation of the device.
Figure 5:
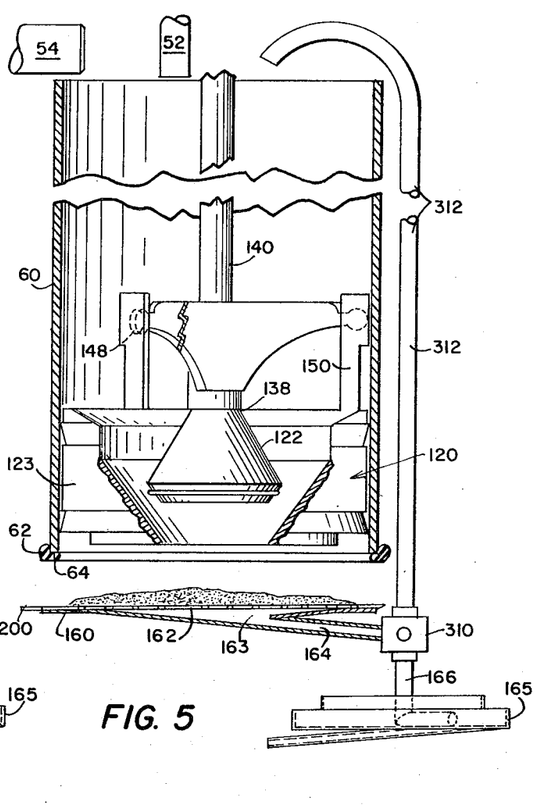
FIGURE 5 is a view as FIGURE 4, with the cylinder raised to allow the reciprocation of the filter, a situation which occurs toward the conclusion of a cycle.
Figure 6:
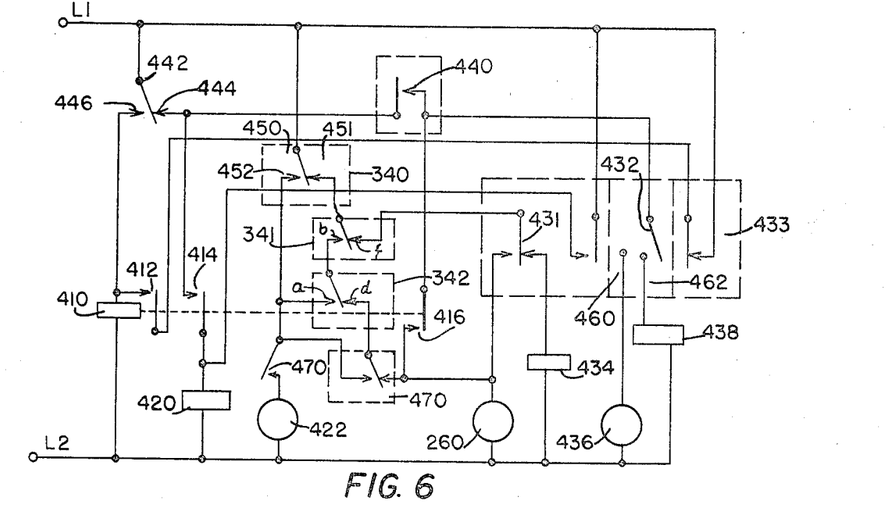
FIGURE 6 is a simplified circuit diagram to effect the operation of the apparatus.

The construction of the apparatus and particularly brew chamber 34 is shown in detail in FIGURES 2, 3 and 4. The chamber is an upright hollow metal cylindrical tube 60 of stainless steel or similar material having good stain resistant qualities. The tube may in the preferred form have a diameter of 3″ and a height of approximately 6″. Fitted about the lower circumferential edge 64 of the cylinder 60 is an O-ring 62. The ring 62 may be of silicone rubber or other resilient sealing material which is impervious to temperatures above 200° F. The tube 60 is held in place with respect to the mounting frame 66 of apparatus 30 by a sheet metal guard member 68 of semi-circular section. The guard member is fixed to the mounting frame by horizontal bracing rods 70, the guard member being spaced from the tube by a series of rollers 72. These rollers ride within a vertically elongated channel 74 in the guard member at the side of the tube remote from the brew control mechanism 38.

The cylinder tube 60 has affixed to its side wall at diametrically opposed pin mounts 80, the ends of two horizontal arms 84 of opposedly positioned bell cranks 88. These arms 84 are secured to the mounting frame 66 at individual pivots 86 on either side of the mounting frame structure 66. The vertical arms 90 of bell cranks 88 are biased at their uppermost ends by tension springs 94 which are mounted horizontally on either side of the mounting frame 66. The springs are mounted to exert a rearward force on the upper bell crank arms and impose a normal upward bias on the cylinder tube.

The tube 60 is constrained to vertical motion by action of rollers 72 within channel 74 and by the bearing rollers 110. Rollers 110 (four in number) are individually fitted on spindles extending horizontally from the mounting frame. The rollers are spaced to bear against the exterior of the tube 60 adjacent its upper and lower ends on either side. The rollers preferably should be made of nylon, Teflon or similar synthetic resinous materials having good abrasion and temperature characteristics.

At each bell crank pivot 86, there is mounted between the bell crank and the frame 66, a cam follower 112 which is free to pivot at its upper end. The follower 112 has a horizontal roller parallel to pivot 86 adjacent its upper end for contact with cams, as will be described.

Within the cylinder tube 60, there is fitted a combined compression element including piston 120 and plunger 122. The piston is a composite member having a body portion 123 with an outer generally tubular wall 124. This wall supports two vertically spaced cup-shaped sealing rings 125 which flex against the inner wall of cylinder 60. The sealing rings 125, as mentioned, are flexible and are supported by spaced stiffening members 126. The flexible rings 125 are spaced apart by an intermediate spacer 129. The sealing rings and stiffening members are compressed upwardly against an outer flange 131 of the piston 120 and are held in place by a metallic retaining ring 130 and an O-ring 127 fitted in a suitable annular groove in the piston outer wall. The sealing rings may be fabricated of Teflon or other suitable temperature resistant, inherently lubricious material and the stiffening members 126 and spacer 129 are preferably of temperature resistant silicone material.

The piston body is hollowed with a frusto-conical opening 128 tapering inwardly and downwardly. Within this opening is fitted the plunger 122 coaxial with the cylinder and having a lower frusto-conical lower surface 132 mating with the adjacent piston opening. The piston body and plunger may be stainless steel or the like to resist the corrosive effects of the liquids to which it is exposed. An O-ring 134 in surface 132 seals the opening when the plunger is depressed into the piston opening 128. The upper portion of the plunger outer wall tapers inwardly in the upward direction from its maximum diameter 136 to its upper end 138. This tapering surface acts to channel material fed from above toward the opening 128 in the piston. At its upper end the plunger is firmly secured to a vertically-extending, rigid, metal operating rod 140.

The rod 140 bears a horizontal yoke 142 which is slideable along the rod. The bore of yoke 142 is slightly greater than the diameter of rod 140, and less than the diameter of the upper end 138 of the plunger. The rod may be hex, square, or otherwise shaped, with the yoke bore shaped in a like manner.

The yoke 142 has three outwardly directed, angularly spaced arms 144, each of which terminates in a slight knob 146. These knobs mate with sized eyelets 148, in individual stirrups 150 extending upwardly from the periphery of piston 120. These stirrups are resilient so they may be depressed outwardly to receive the knobs within the eyelets to fasten the plunger and piston.

With this piston and plunger construction, movement of the axial rod 140 moves the plunger accordingly, due to the direct drive connection between these elements. On downward movement of the plunger, the plunger lower conic surface 132 sealingly contacts the wall of the central piston opening 128 and forces the piston down accordingly. Upward movement of the rod 140 raises the plunger and opens a passage or feed gap between surface 132 and opening 128. During further upward movement of the plunger, its top surface 138 strikes the lower surface of yoke 142 and raises the yoke and piston accordingly.

Below the cylinder tube 60 is positioned a stationary table 160 with an annular opening 162 below the cylinder, the diameter of opening 162 being slightly less than the diameter of cylinder 60. The opening 162 is in communication with a shallow duct 163 which tapers to join a tubular passage 164 leading through a valve to the dispensing tube 166. The dispensing tube in turn leads to suitable mixing structure 165 for subsequent gravitational flow of the beverage to the dispensing cup for the drink purchaser. Table 160 houses a reciprocating mechanism, the effect of which is to rotate two large rollers 168. These rollers are spaced at opposite ends of the table 160 with their respective axes 169 parallel and horizontal. These rollers may be made of suitable rubber or plastic material having respective diameters of about 2".

These rollers each have an axial shaft at a like end of which is mounted a regularly toothed wheel 170. In mesh with the teeth of each wheel is a sector pinion 174 at the upper end of a crank arm 172. The sector pinion 174 meshes with the toothed wheel 170 to oscillate the wheel. The crank arm is pivotally mounted near its lower end 176 and above its mountings connected to a horizontal reciprocating bar 178 of mechanism 180, the connection being approximately midway between the sector pinion 174 and its pivotal mounting.

In this mechanism 180, a motor driven rotatable disc 184 is mounted midway between the rollers. A pin 182 is mounted eccentrically on the disc 184. As the disc rotates, the pin rides in a vertical slot 186 of a crosshead 188 of bar 178, the slot moving at right angles across the plate. The crosshead is centrally positioned and may be integral to the bar 178 with bar arms extending perpendicularly from the vertical slot. The arms at their extreme ends are connected to the crank pinion arms 172 intermediately between their ends.

Within this mechanism, rotation of disc 184 causes horizontal reciprocation of bar 178, oscillation of pinions 174, and periodic rotation of rollers 168, as will be explained more fully.

Figure 7:
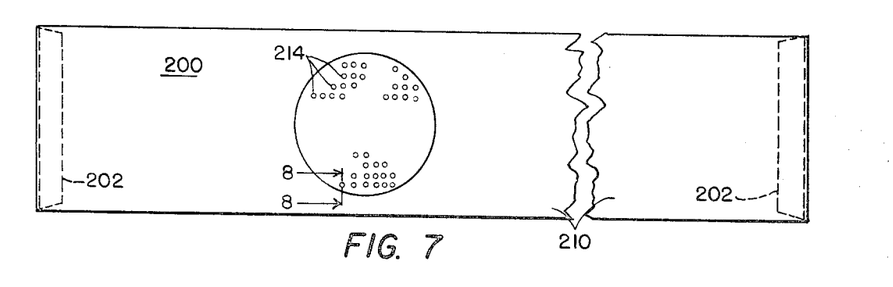
FIGURE 7 is a plan view of a typical filter as used herein.
Figure 8:
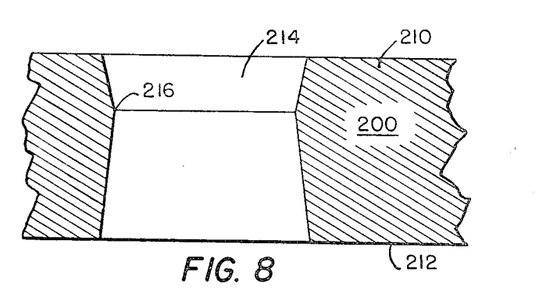
FIGURE 8 is a sectional view taken along line 8—8 of FIGURE 7.

Resting on table 160 is the filter element which is an elongated rectangular metal strip 200. The strip is secured at either end of the table 160 to the respective rollers 168. The strip 200 may be wrapped around each roller one or more revolutions terminating in an angled portion 202 fitted into an angled slot 204 in the rollers' outer cylindrical surface 206. The strip material may be stainless steel spring stock which in one preferred form is about two thousandths of an inch thick. The opposed surfaces 210 and 212 of the strip are etched throughout a circular area to produce a plurality of spaced pores or openings 214. These individual openings as shown in FIGURE 7 are tapered slightly from an internal shoulder 216 outwardly toward the opposed surfaces 210 and 212 with the shoulder diameter being in the order of two thousandths of an inch. The shoulder 216 is closer to the top surface of the filter so that coffee grounds resting on the shoulder will protrude above the top surface of the filter such that they can readily be dislodged.

The material of the strip 200 must be a material which is able to resist the substantial amount of corrosion present due to its contact with high temperature liquids. The material thickness is great enough to allow the strip to be flexible, yet is resistant to cracking. The etching from both sides provides a smooth, level surface which can be scraped clean by a horizontal surface scraper. The shape of the openings 214 is designed to inhibit the bridging of coffee or tea particles within the pores, and the diameter of the openings is sufficiently small to pass only the very fine coffee ground particles.

Beneath each roller 168 (*f* and *r*) and tangentially disposed with respect to the outer surface 206 of each roller is a generally stationary lower scraper 220. Each scraper 220 is individually pivotally mounted intermediately along its height by a horizontal shaft 222 extending through the scraper and mounted to the table structure 160. The scrapers 220 are biased into contact with the roller surfaces along a line of contact 224 parallel to the roller axis, the bias being imposed by a tension spring 228. The spring is affixed to each scraper, above the individual pivotal mounting shafts 222 to hold the top scraper edge 224 in contact with the roller surface 206.

Each of the two lower scrapers 220 is V-shaped in section, the V being relatively shallow with the transverse edges 230 disposed above and below the apex 226 of the V. Each scraper is pivotal about its horizontal shaft 222 substantially at the V apex 226. The upper one of these sharp transverse edges 230 is in contact with the roller. The scraper is symmetrical so that when one knife edge 230 becomes dulled the scraper may readily be inverted and the other (formerly bottom) edge 230 may be placed in contact with the roller. Within the V apex 226 of each scraper 220 is affixed a yoke 248 with upper and lower transverse openings 250 for anchoring the tension spring 228 to the roller. Only the upper opening is used, the lower opening having been provided for use when the scraper is inverted. The other or remote end of the biasing spring 228 is anchored to a mounting ear 252 extending downwardly from table 160. Each of the scrapers is mounted below a roller with the scraper upper surface in contact with the roller surface along a line of contact 224 outwardly of the table.

An upper scraper 240 is mounted adjacent the front roller 168*f*. This scraper 240 is fixedly mounted on a transverse shaft 242, the shaft in turn being fixed to a bifurcated downwardly open bracket 244. The shaft 242 is mounted rotatably on the table structure. The forked bracket is moved backwardly and forwardly by a cam arm 246 affixed to the roller toothed wheel 170. The connection is such that when the reciprocating mechanism moves the filter strip 200 forwardly, the cam arm 246 engages the forked bracket 244 and pivots the upper scraper 240 out of engagement with forward roller 168*f*. On the return stroke of the reciprocating mechanism, the cam arm 246 engages the forked bracket and moves the scraper 240 into a firm contact with the roller surface.

The brew control mechanism 38 includes primarily a drive motor 260, its driven cam shaft 261, and a plurality of cams in a cam set 262 driven thereby, the mechanism being fitted within an upright mounting housing 263 at the front and side of the brew chamber 34.

This mechanism 38 includes a plurality of cams in cam set 262, of which two cams 264 are used to raise and lower the bell crank 88 to thereby raise and lower the cylinder 60. Two cams 266 and 267 are used to actuate a lever system connected to the upper end of piston rod 140, one cam 266 for raising, the other for lowering the piston 120 and plunger 122 to effect a pump cycle. Cam 266 will be called the lift or raise cam, while cam 267 will be termed the lowering or pump cam. Another cam 268 actuates the valve mechanism 270 in the outlet tube network. Other cams, not shown, control various electrical contacts to make and break various control circuits, as will be described more fully.

The bell crank control cams 264 are generally circular for most of its periphery 272 and have a depression 274 of short extent to raise the cylinder 60 under the effect of tension springs 94. This raising of the cylinder lasts for only a short duration of the mechanism operative cycle and is activated only when cam follower 112 enters the depression 274. Cam follower 112 releases its engagement with the bell crank upper arms 90, and these arms are drawn by tension spring 94 toward the cam shaft 261 raising the lower bell crank arms 84 and cylinder 60. During the cycle, when cylinder 60 is to be lowered, follower 112 leaves cam depression 274 and rides on its periphery 272. The follower engages the upper bell crank arms 90 and forces the cylinder 60 downwardly in a tight compressive fit on table 160.

The combined plunger and piston assembly, as mentioned, is actuated by a lever system, two cams 266 and 267. The lever system comprises a generally horizontal lever arm 280 pivotally mounted at 279 to stationary housing 263 at the lever arm end closest to the cylinder 60. Arm 280 extends over the pump cam 267 and at approximately its midpoint has a roller cam follower 284 engageably adjacent the surface of pump cam 267. The other end 286 of arm 280 is pivotally pinned to the lower end of an adjustable threaded lever 290. Lever 290 extends generally vertically and at its upper end 292 is pinned to one end of a second horizontal lever 294. Lever 294 is pivoted on shaft 278 at approximately its midpoint to a stationary portion of the housing 263. The free end of lever 294 is connected to upper end of the combined plunger and piston rod 140. Lever 294 has a protruding tab 287 located below and to the free end side of pivot point 278. A link 288 connects lever 294 at pivot pin 291 to the top end of a lift cam roller lever 289 at pivot pin 293. The lower end of lever 289 is pivoted on shaft 279. Shaft 279, it will be remembered, is used to pivotally mount lever arm 280 to housing 263. The cam roller lever 289 is formed into a recumbent T shape and contains a cam roller 295 in the stem end 297 of the T. Roller 295 rides on lift cam 266 and thus actuates the linkage for its lift stroke.

With the construction set out, the lever system comprises a complex, planar rectangular figure which is controlled by positive action contact of roller 295 on lift cam 266 to raise the piston rod 140 and by roller 284 on pump cam 267 to lower the piston rod.

The other valve 268 is used to operate the roller valve in the outlet and recirculating system. This system comprises a first duct 163 in communication with cylinder 60 through the opening 162 in the stationary table. Duct 163 is connected to a short duration tube 164 which may be made of any acceptable flexible or rigid tubing. Tube 164 is connected to the inlet of a valve 310 in mechanism 270. One outlet of valve 310 leads to the dispensing tube 166. Tube 166 in turn leads to a mixing bowl 165 or the like for passage to the cup on dispensing. At valve 310, there is a second outlet tube 312. Tube 312 extends upwardly parallel to the cylinder and terminates in a recurved portion within the cylinder 60 above the piston 120. Suitable clamps 314 may be used to hold the valve 310 and recirculate tube 312 in place. With the valve in a first position, the duct 164 is open to the recirculating tube 312 and closed to the dispensing tube 166. In the second position of the valve, the passage 164 is in communication with the dispensing tube 166 and is isolated from the recirculating tube 312.

Positioned operably adjacent the various lever systems in the apparatus are three limit switches 340, 341 and 342 which may be of the miniature snap-acting type. All three are double throw switches which are switched to one condition and remain in that condition until restored. Two of these switches, 340 and 342, are mounted on the filter reciprocating mechanism 180, as can be seen in FIGURE 3. The first of these, switch 340, called the the cycle switch, is mounted to the underside of the table structure in position to be actuated by a cam 344 which receives the switch operating arm 348 at one point during the cam revolution and operates the switch once for each traverse of the filter strip.

A second of these switches 342 is also mounted to the table structure. A pivotal cam finger 350 is mounted adjacent the bottom of the sector pinion crank arm 172 and is designed to be raised on rotation of the crank arm in one direction. Finger 350 in turn strikes an L-shaped switching bracket 352 on the bracket leg 354.

The bracket spine 356 is pivotal planarly so that striking of the leg 350 pivots the bracket spine into contact with switch operator 360, the switch operator operating the switch 342.

The third switch 341 (FIGURE 2) is positioned adjacent the cylinder operating cam 264 and is actuated on movement when the cylinder is raised.

Figure 9:
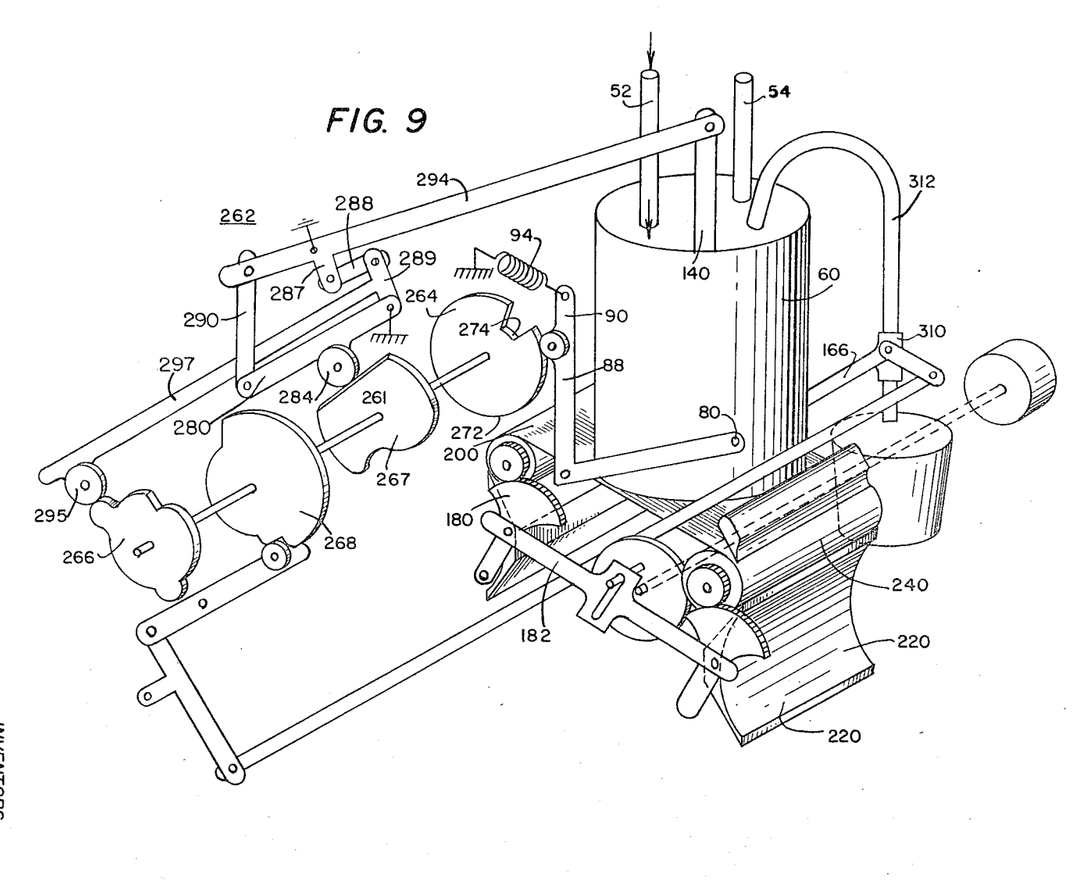
FIGURE 9 is a schematic perspective view of the brew chamber and filter mechanism.

Now turning to the circuit of FIGURE 9, it can be seen that this drawing has been stripped of features nonessential to this disclosure, such as dispensing of soluble products, for example, hot chocolate or soup, and dispensing of additives, such as sugar or cream.

In addition, such necessary, but well-known elements and functions as heating the water in the storage tank and maintaining temperature and quantity have been omitted, along with the functioning of the cup dropping mechanism, coin acceptance, and credit registering mechanisms, as these are elements and functions which are not essential to the explanation of the present invention.

In the circuit drawing, there is shown a pair of source leads L1 and L2 which are designed for connection to a conventional 110 volt AC source. Within the circuit fed by these source leads is a credit relay 410 which controls sets of contacts 412, 414, and 416; a selector solenoid 420; a filter traverse or reciprocate motor 422; the brew control motor 260 and cam actuated contact sets 431, 432, and 433; a coin lockout solenid 434; a coffee feed motor 436 and a water inlet solenoid 438. A single selector switch 440, normally open, is closed on manual actuation to initiate the dispensing of a single cup of coffee. Switch 440 represents a simplified showing of a plurality of switches to provide a selection comprised of options which have in the main been deleted—such as cream, sugar and/or cream and sugar. A coin switch 442 is responsive to the insertion of a proper coin to transfer from stationary contact 444 to contact 446. The operation of switch 442 is momentary, the switch restoring to its normal condition, closed to contact 444, automatically shortly after its operation. In addition, three double throw limit switches are provided, as previously discussed, the first, switch 340, being mounted on the reciprocating mechanism 180. Switch 340 in its normal position has its armature 450 closed to stationary contact 451, and in its operated position closed to contact 452.

The second switch 341, the cylinder switch, is operated with the cylinder and normally has its armature closed to contact $f$. The switch closes to its contact $b$ only when the cylinder is raised.

The third switch 342, the reset switch, is mounted on the reciprocating mechanism 180 and normally is closed to contact $d$ and on actuation closes to contact $a$.

Now turning to the operation of the brewing apparatus, the following description will describe a cycle for the brewing of a single cup quantity of coffee. At the start of a cycle, the brewing cylinder 60 is resting on table 160 with the metallic filter 200 resting on the table of the central opening 162. The piston 120 is in its lowermost position, and the plunger 122 is in its uppermost position. This relative positioning of the piston and plunger opens a passageway through opening 128 in the piston. At this time, the valve 310 is in its mid position with both outlets open.

A cycle is initiated by the insertion of a coin and the subsequent switch 442, followed by selection of the type of desired beverage as indicated by the closure of switch 440. On receipt of a coin, coin responsive switch 442 closes to stationary contact 446 closing an obvious energizing path for credit relay 410. Relay 410 operates and closes its contact sets 412, 414, and 416. At contact set 412, relay 410 closes a hold path for itself through now closed cam actuated contacts 433. Once relay 410 has operated to close its contact set 412, the coin switch 442 restores to its normal position closed to contact 444 opening the original energizing path to the relay. Relay 410 remains operated over the hold path. Contact set 414, now closed, completes a path for energization of selector solenoid 420 through now closed contacts 444–442. The operation of this solenoid allows a selection to be effected. When a selection has been made, by closing switch 440, a circuit is completed to energize brew control motor 260. This motor operating path may be traced from lead L2 through motor 260, contact set 416, switch 440, and contact set 444–442 to lead L1. Brew control motor 260 operates and begins a rotative cycle of the cams 262. Once the brewer motor is energized, it remains energized, as will be explained, for a period sufficient to rotate cams 262 through a complete cycle.

Once the brew control motor 260 has been energized, it closes contacts 431 to close a hold path for the brewer motor over a path through the normally closed contacts of switches 341 and 340. Shortly thereafter, as the brew control motor 260 continues into its cycle, contacts 433 release to open the hold path to credit relay 410. Relay 410 restores and opens its contact sets 412, 414, and 416. As contact set 416 opens, it opens the original operating path to the brew control motor 260 and transfers the control of brew motor to switches 340 and 341.

At this time, cam 268 operates the valve mechanism to its recirculate position in which the outlet passage 164 from the brew chamber is open to recirculate tube 312. The piston lift cam 266 begins to raise plunger rod 140. The plunger upper end 138 engages yoke 142 and raises the piston 120 and plunger 122 jointly. As this action occurs, contact 432 is closed to stationary contact 460. This closure completes a circuit to the coffee feed motor 436 for a timed period sufficient to meter a predetermined quantity of coffee grounds. This metered amount of coffee is fed through conventional means (not shown) and inlet duct 54 which is in communication with the interior of brewer chamber 34. This quantity of coffee grounds passes through opening 128 in the piston and comes to rest on the metallic filter strip 200 within the chamber. Approximately contemporaneously with the coffee feed, contacts 432 close to stationary contacts 462 to energize water solenoid 438. Solenoid 438 is energized for a predetermined length of time sufficient to dispense a quantity of water heated to approximately 200° F. through water inlet tube 52. Tube 52 is in communication with the interior of brew chamber 34, so that this hot water passes through the piston opening 128. The water mixes with the coffee grounds and a very small portion of the liquid passes through filter 200 and through shallow duct 163 and into recirculate tube 312. Liquid rises in this tube to the level of the liquid in the brew chamber. Contacts 432 thereafter open both feed circuits and remain open for the duration of the cycle.

At the start of this fill period as the grounds and hot water pass into the chamber, they mix with the grounds in suspension in the liquid and the brewing begins. The grounds soon begin to fall onto the filter and form a bed covering the chamber area on the filter. This period which lasts for but a fraction of a second is sufficient to begin the brewing process.

At the conclusion of this fill period, which may encompass approximately 45° of rotation of lift cam 266, the piston and plunger will have reached the top of their combined upward stroke. Pump cam 267 will thereafter depress the plunger 122 until the plunger engages the wall of passage way 128. Continued downward movement of the plunger will result in continued downward movement of the piston also. During this downward movement, the plunger is sealed to the piston by plunger surface 132 and its O-ring 134. The piston is sealed to the chamber or cylinder tube 60 by sealing rings 125 and 127. Also it should be noted that the cylinder is sealed to the table 160 by the sealing ring 62; thus, as the plunger and piston combinedly move downwardly in the cylinder tube in a compression stroke, internal pressure within the cylinder increases. This pressure increase is transmitted to the hot water in the cylinder. As the piston and plunger continue the downward travel, the greater portion of liquid is forced through the bed of coffee grounds, and continues the removal of the aromatic oils from the coffee grounds. The brewed beverage passes through the bed of coffee grounds on the filter and through the filter screen 200. The liquid is pumped by this pressure through opening 162, duct 163, passage 164, and valve 310 to recirculating tube 312 for return to the chamber.

As the piston 120 descends to circulate the liquid during the previously described compression stroke, a quantity of air is trapped above the liquid. This quantity of air is determined by the volume of the cylinder as diminished by the volume occupied by the liquid fed into the cylinder. In the preferred form of the invention, this quantity of air should be sufficient to insure that on the compression stroke of the piston and plunger, all of the liquid fed into the cylinder will be pumped into the recirculate tube and into the cylinder above the piston and plunger. During this compression stroke, the coffee grounds fall onto the filter and are retained there. This action, just described, occurs during a short angular interval of rotation of the piston pump cam 267. With the once brewed liquid fully pumped into the cylinder, the valve 310 is operated to oscillate recirculate tube 312 from communication with duct 164. By this movement, dispensing tube 166 is placed into communication with duct 164 leading from the table opening 162.

When the valve 310 has been transferred to its dispensing position, the continued rotation of lift cam 266 raises the plunger rod and plunger 122. The plunger is rapidly elevated from the piston to open passage way 128 and to allow the once-brewed liquid to pass through the opening 128 onto the bed of coffee grounds resting on filter strip 200. The plunger continues its upward movement and raises the piston 120 within the cylinder. The travel in this second upward movement of the piston and plunger may be of slightly lesser extent than the travel of the first movement since less pumping action is required by this second portion of the cycle.

When the plunger 122 and piston 120 reach the top of their second rise, reset switch 342 switches its armature from normal position, as shown, closed to contact $d$ to a position closed to contact $a$. This switching action prepares a path for the filter motor 422. This path, is, however, open at switch 341. Shortly thereafter the pump cam 267 in its continued rotation begins to depress plunger 122 into piston 120 and close the passage way 128. Continued depression of the plunger forces the piston and plunger downwardly to begin a second pumping action. This pumping action forces the once-brewed beverage through the bed of coffee grounds and through the filter strip 200. This action causes a filtering of fine particles entrained in the liquid as a result of the first passage of the partially brewed beverage through the coffee bed. Thus, the coffee bed acts as a fine filter during the second pumping. With the fine coffee particles trapped on the top of the bed, the now clear liquid passes through the openings 214 in filter strip 200. The brewed liquid then passes through the central opening 162 and passage 164 to dispense tube 166. From the dispensing tube 166, the twice brewed beverage passes to the mixing bowl 165 for dispensing.

As described with respect to the recirculating step in the cycle, a quantity of air is compressed by the downward movement of the combined piston 120 and plunger 122 and passes through the bed of wet grounds after the brewed beverage. This passage of air tends to dry the coffee grounds resting on the filter 200. As the piston reaches the bottom of its downward stroke, all of the brewed beverage has passed through the coffee grounds and has been dispensed. The dry air flow has also passed through the bed of grounds.

As the next step in the operation, the piston 120 must be retracted partially and the cylinder 60 must be elevated in order to slideably remove the grounds from the filter 200. At this point in the cycle, cams 264 act on the arms of bell crank 88 to raise the cylinder 60 a distance which may approximate ½". As the cylinder 60 is being raised, the plunger 122 is raised to open the interior passage way 128 in the piston, and the piston is in turn raised a limited distance to its normal or at rest position, slightly above the bottom of the now raised cylinder 60.

As the cylinder 60 reaches its uppermost position, it transfers switch 341 from its normal closure to contact $f$ to a closure to contact $b$. This transfer at switch 341 opens the hold path to brew control motor 260, and the motor 260 stops intermediately in its cycle. As the brew control motor stops, movement of the cylinder and of the piston and plunger is halted temporarily. This closure at switch 341 completes a path to the filter motor 422. This motor begins to rotate and on rotation moves the reciprocating mechanism 180 in the direction indicated by the direction arrow S in FIGURE 3. A few degrees of movement of rotation of filter motor 422, causes switch 340 to switch its armature to an operate path through stationary contacts 452. This alternate path provides a direct circuit for energizing the filter motor 422. The reciprocating mechanism rotates the rollers 168. The filter strip begins to wrap around roller 168$f$. As the strip moves, the movement of mechanism 180 causes upper scraper 240 to be pivoted out of engagement with the roller, such that the bed of coffee grounds pass thereunder. As the mechanism 180 continues its movement, the bed of coffee grounds passes under scraper 240 and begins to fall off the filter strip as the bed drops over the roller periphery 206. The scaper 220 is in contact with the filter strip 200 and scrapes the upper surface of the filter strip 200 as the strip passes the scraper in wrapping onto roller 168$f$. This scraping action removes all the grounds resting on the surface of the filter strip and due to the biased contact of the scraper with the filter strip, the strip is thoroughly cleaned. When the travel of strip 200 in the forward direction reaches the end of its travel path, limit switch 342 is restored, to switch its armature to a closure to stationary contact $d$. This last-mentioned switch transfer opens the original operating path to filter motor 422 and transfers the operation of the filter motor to control of switch 340 alone.

As the motor 422 continues its operation, the reciprocating linkage 180 reverses the direction of movement of the rollers and causes the strip to unwrap from the roller 168$f$, and to begin to wrap about roller 168$r$. The upper surface of the filter screen is again scraped by lower scraper 220. During this restorative movement, the upper scraper 240 is pivoted into surface contact with the metallic filter strip 200 and performs another scraping action for particles dislodged from the openings 214 in strip 200 by the filter strip movement. The travel cycle of the filter motor continues and when 360° of revolution of the filter motor mechanism have been completed, switch 340 restores to open the path through contact 452. Filter motor 422 is thus deenergized and the filter strip is restored to its normal position on table 160.

This last-mentioned transfer of switch 340 recloses the switch armature 450 to stationary contact 451 to close the alternate operating path to the brew control motor 260. This path may be traced from lead L1 through switch 340 and its contacts 450–451, through switch 341 and its contact $b$, through switch 342 and its contact $d$ and closed contacts of test switch 470 to the brew control motor 260. The brew motor once energized, begins movement of the cylinder cam 264 to lower cylinder 60 and after a few degrees of cam rotation, switch 341 restores to its normal position thereby transferring operation of the brew motor 260 from the alternate operating path at switch 470 to control by cam contacts 431. The brew control motor is energized once again and continues through its cycle.

During the latter portions of the brew control motor cycle, the valve cam 268 operates valve mechanism 270 to its at rest position with all ports open. The brewer motor during the latter phase of its cycle, causes the cylinder cam 264 to depress cylinder to its start position at rest on stationary table 160. The brewer motor having completed its cycle, opens contacts 431 in its operate path at the conclusion of a full revolution of the cams of set 262. The brew control motor 260 is deenergized and the system is held at rest awaiting the start of a next cycle.

What we claim is:
1. A hot beverage brewing apparatus comprising:
   (1) a stationary table with an opening therein,
   (2) a brew chamber resting on said table with the interior of the chamber in communication with said opening,
   (3) a reusable foraminous filter resting on said table between said cylinder interior and said opening,
   (4) a plurality of scrapers each having an edge surface operably adjacent said filter,
   (5) means for feeding leachable beverage solids into said chamber whereupon said solids fall onto said filter,
   (6) means for feeding hot liquid into said chamber for brewing mixture with said solids,
   (7) brew control means for accelerating the brewing of beverage from said mixture and for passing said brewed beverage through the filter and said opening, and
   (8) a drive mechanism operative consequent to passage of said beverage for sliding said filter past said scrapers to effect removal of the leached solids from said filter during said slide movement.

2. An apparatus as claimed in claim 1, in which:
   (1) said plurality of scrapers includes a first scraper and a second scraper,
   (2) said drive mechanism includes a linkage for sliding said filter past said first scraper, and
   (3) said linkage includes means for inactivating said second scraper during said slide movement and for reactivating said second scraper during return movement of said filter.

3. An apparatus for brewing hot beverage in single cup quantities including:
   (1) a stationary surface with an opening therein,
   (2) a brew chamber resting on said surface with the interior of the chamber in communication with said opening,
   (3) a reciprocable reusable filter resting on said surface between said cylinder interior and said opening,
   (4) a scraper having a line contact with said filter,
   (5) means for feeding a single cup charge of extractive beverage solids into said chamber whereupon said solids fall onto said filter,
   (6) means for feeding a single cup charge of hot liquid into said chamber for brew mixture with said solids,
   (7) compressive means for accelerating the brewing of beverage from said mixture and for forcing said brewed beverage through the filter and said opening for dispensing, and
   (8) control means for reciprocating said filter past said scraper to effect scraping of the leached solids from said filter during said reciprocation, and for restoring said filter to position with respect to said opening.

4. A hot beverage brewing apparatus including:
   (1) a reciprocable reusable strip with a porous filter section therein,
   (2) a brew chamber resting on said strip with the interior of the chamber in communication with said porous section,
   (3) means for feeding fresh leachable beverage solids into said chamber whereupon said solids fall onto said filter section,
   (4) means for feeding a measured quantity of hot liquid into said chamber, (5) pressure means forcing said liquid through solids to force said brewed beverage through the porous section of said strip,
(6) a plurality of scrapers positioned adjacent said strip and in contact with the strip outside the porous section,
(7) means for slideably moving said strip past said scrapers to draw said porous section past said scrapers to effect a scraping action, and
(8) drive means for retracting said metal strip past said scrapers to effect a second scraping action as the porous section passes said scrapers toward restoration of its solids receiving position.

5. A beverage brewing apparatus including:
(1) a brew chamber,
(2) a reciprocable metal strip, with an intermediate porous filter section therein positioned beneath said chamber,
(3) a pair of rollers, one at each end of said strip for mounting said strip,
(4) means for feeding fresh leachable beverage solids into said chamber whereupon said solids fall onto said filter section,
(5) means for feeding brew liquid into said chamber,
(6) pressure means forcing said liquid through the solids in said chamber to further the brewing of the beverage and for forcing said brewed beverage through the porous filter section,
(7) control means for rotating one of said rollers to slide said strip porous section out of said chamber after a brew cycle,
(8) a plurality of scrapers positioned adjacent said strip for scraping leached solids from said strip on sliding thereof, and
(9) said control means operative to rotate said other roller to complete a second scraping action and restore the porous section of said strip to its position with respect to the chamber before the start of another cycle.

6. An apparatus as claimed in claim 5, in which:
(1) there is a first of said scrapers biased against one roller to scrape the surface of the strip on movement of said strip out of said chamber, and
(2) a second scraper movable into scraping contact with the surface of said one roller on the restorative movement of said strip.

7. An apparatus for brewing coffee in single cup quantities comprising:
(1) a stationary surface with an opening therein,
(2) a brew cylinder resting on said surface with the interior of the cylinder in communication with said opening,
(3) a reciprocable porous reusable filter resting on said surface between said cylinder interior and said opening,
(4) a piston structure in said cylinder,
  (a) said structure including an outer piston in sealing contact with said cylinder, and
  (b) a plunger movable jointly with said outer piston and movable with respect to said outer piston to open a feed gap therebetween,
(5) means for feeding a single cup charge of fresh coffee grounds into said cylinder whereupon said coffee grounds pass through said piston structure gap to fall onto said filter,
(6) means for feeding a single cup charge of hot water into said cylinder to brew coffee beverage therein,
(7) control means for moving said plunger to close said gap consequent to the conclusion of said feeding and for moving said piston structure to drive said brewed beverage through said filter for dispensing,
(8) means operated consequent to the dispensing of said beverage for slideably moving said filter from said cylinder, and
(9) a plurality of scrapers adjacent one end of said filter for scraping coffee grounds from said filtering during said sliding movement.

8. A coffee brewing apparatus comprising:
(1) a brew chamber,
(2) means for feeding fresh coffee grounds into said chamber,
(3) means for delivering hot water to said chamber for brewing of coffee beverage therein,
(4) a brewed coffee outlet leading from said chamber,
(5) valve means in said coffee outlet,
  (a) said valve means operable between a first and a second position,
  (b) a recirculatory passage communicating with said outlet for passing liquid to said chamber with said valve means in said first position,
(6) brew control means for forcing said beverage through said grounds, and said outlet, and into said chamber when said valve means is in its first position,
(7) a dispensing passage in communication with said outlet when said valve means is in its second position, and
(8) control means for operating said valve to its second position and for reoperating the brew control means to force the brewed coffee from said chamber through the grounds a second time and to said dispensing passage after said recirculation for dispensing of the brewed coffee.

9. A coffee brewing apparatus comprising:
(1) a brew chamber,
(2) a reusable porous filter strip covering the base of said chamber,
(3) means for feeding fresh coffee grounds into said chamber to drop said grounds on said strip,
(4) means for delivering hot water to said chamber to brew coffee beverage therein,
(5) compressive means for driving said hot beverage through said grounds,
(6) a brewed coffee outlet passage receptive of brewed coffee beverage,
(7) valve means in said outlet passage,
  (a) said valve means operable between a first and a second position,
  (b) a recirculatory passage open to said outlet passage with said valve means in said first position,
    (1) said recirculatory passage receptive of beverage driven from said chamber to recirculate same to said chamber for a second brewing action,
(8) a dispensing passage communicating with said outlet passage with said valve means in its second position,
(9) control means for operating said valve to its second position to emit brewed coffee from said chamber to said dispensing passage for dispensing of the brewed coffee, and
(10) means responsive to dispensing for reciprocating said strip to remove the coffee grounds therefrom.

10. A coffee brewing apparatus including:
(1) a stationary surface with an outlet therein,
(2) a brew cylinder resting on said surface with the interior of the cylinder in communication with said outlet,
(3) a recirculatory passage leading from said outlet,
(4) a dispensing passage leading from said outlet,
(5) transfer means for placing either passage in communication with said outlet,
(6) means for feeding fresh coffee grounds into said cylinder,
(7) means for feeding hot water into said cylinder to brew the coffee beverage therein,
(8) cycle control means operative to maintain said recirculatory passage in communication with said outlet and isolating said dispensing passage, (9) a piston depressible in said cylinder to force said brewed beverage through said outlet and said recirculatory passage into said cylinder, (10) said transfer means operative consequent to the recirculation of beverage to place said dispensing passage in communication with said outlet and isolating said recirculatory passage, and (11) means for depressing said piston a second time to force said beverage to said dispensing passage.

11. A hot beverage brewing apparatus comprising:
(1) a brew chamber,
(2) means for feeding leachable solids into said chamber,
(3) means for feeding hot water into said chamber,
(4) means for pressuring said hot water through said grounds to effect a partial brewing action,
(5) a brewed beverage delivery passage in communication with said chamber for receiving the brewed beverage therefrom,
(6) a valve at the outlet of said delivery passage,
  (a) said valve operable into a recirculatory position and a dispensing position,
(7) a recirculatory passage in communication with said chamber for feeding partially brewed beverage from said passage to said chamber with said valve in its recirculatory position,
(8) an outlet duct leading from said delivery passage with said valve in its dispensing position, and
(9) cycle control means for operating said valve during a brewing cycle to said recirculate position to recirculate partially brewed beverage to said chamber for a second brewing and for thereafter operating said valve to its dispensing position to dispense fully brewed beverage.

12. A hot beverage brewing apparatus comprising:
(1) a brew chamber,
(2) means for feeding leachable beverage solids into said chamber,
(3) means for delivering hot liquid to the solids in said chamber,
(4) a piston reciprocable in said chamber for pressuring said hot liquid through said grounds,
(5) a brewed coffee delivery passage receptive of brewed beverage from said chamber,
(6) valve means in said delivery passage operable to a first position to divert brewed beverage back onto said chamber for a second pass through said solids,
(7) an outlet passage leading from said delivery passage, and
(8) control means for operating said valve means to a second position to emit the brewed beverage from said chamber to said outlet passage after said second pass for dispensing of the brewed beverage.

13. An apparatus for brewing beverage comprising:
(1) a brew cylinder,
(2) an outlet passage leading from the bottom of said cylinder,
(3) a horizontally reciprocable reusable filter interposed to filter beverage passing from said cylinder to said passage,
(4) a piston movable in said cylinder to pump beverage from said cylinder to said passage,
(5) a plunger disposed in said piston for joint movement therewith,
(6) drive means allowing relative movement between said piston and plunger to open an aperture therebetween,
(7) means for feeding beverage brewing ingredients such as leachable solids and liquid into said cylinder to fall through the aperture into the cylinder for brewing of the beverage therein,
(8) said drive means operative to close said piston and plunger aperture after the feeding of the ingredients to pump said liquid through the solids and said passage, and
(9) means for reciprocating said filter to remove leached solids therefrom.

14. An apparatus for brewing coffee beverage comprising:
(1) a brew cylinder open at both ends,
(2) an output duct leading from the bottom of said cylinder,
(3) a recirculatory passage leading from said duct to the cylinder above the piston,
(4) a horizontally reciprocable reusable filter covering the open bottom of said cylinder to filter beverage passing from said cylinder to said duct,
(5) a piston structure movable in said cylinder to pump beverage from said cylinder and comprising a piston and plunger,
  (a) said plunger connected to said piston for joint movement therewith,
  (b) the piston-plunger connection allowing relative movement between said piston and plunger to open an aperture therebetween,
(6) means for feeding coffee brewing ingredients such as leachable coffee grounds and hot liquid into said cylinder to fall through the aperture onto the filter for coffee brewing within the cylinder,
(7) control means operative to close said piston structure and plunger aperture after the feeding of the ingredients to pump brewed coffee beverage through the coffee grounds and to recirculate said beverage back into the cylinder above the piston,
  (a) said control means including a plurality of driving cams and mechanisms driven thereby, to allow recirculated coffee beverage to pass through the aperture in said piston structure,
  (b) transfer means for isolating said recirculatory passage,
  (c) means for depressing said piston structure to force the brewed coffee beverage through the filter and grounds resting thereon, and
  (d) means operative only after the recirculation of coffee beverage to the cylinder has occurred for removing the spent coffee grounds from the filter and for restoring the filter to position with respect to the cylinder.

References Cited

UNITED STATES PATENTS

| | | | |
|---|---|---|---|
| 2,392,452 | 1/1946 | Baumann | 99—289 |
| 2,907,266 | 10/1959 | Moulden | 99—289 |
| 2,935,011 | 5/1960 | Perlman | 99—283 |
| 2,939,380 | 6/1960 | Parraga | 99—283 |
| 3,046,869 | 7/1962 | Reynolds | 99—289 |
| 3,064,553 | 11/1962 | Simjian | 99—289 |
| 3,095,800 | 7/1963 | Gilbert | 99—289 |
| 3,349,690 | 10/1967 | Heier | 99—289 |

ROBERT W. JENKINS, *Primary Examiner.*

U.S. Cl. X.R.

99—302